United States Patent [19]

Marritt et al.

[11] E Re. 30,865

[45] Reissued Feb. 16, 1982

[54] MANUFACTURE OF FILTER-TIPPED CIGARETTES

[75] Inventors: Clifford R. Marritt, Richmond, Va.; Robert E. Williams, Orpington, England

[73] Assignee: Molins Limited, London, England

[21] Appl. No.: 961,331

[22] Filed: Nov. 16, 1978

Related U.S. Patent Documents

Reissue of:

[64] Patent No.: 3,999,559
Issued: Dec. 28, 1976
Appl. No.: 472,922
Filed: May 23, 1974

[30] Foreign Application Priority Data

May 30, 1973 [GB] United Kingdom ..... 25738/73

[51] Int. Cl.[3] ..... A24C 5/14; A24C 5/18

[52] U.S. Cl. ..... 131/60; 131/61 A; 131/84 R; 131/84 A; 131/94

[58] Field of Search ..... 131/61 A, 61 R, 61 B, 131/60, 62, 66 R, 66 A, 64 R, 84 C, 94, 84 A, 67, 84 B; 93/1 C, 77 FT; 100/151

[56] References Cited

U.S. PATENT DOCUMENTS

| | | | |
|---|---|---|---|
| 2,066,460 | 1/1937 | Edwards | 131/61 A |
| 2,164,423 | 7/1939 | Podmore | 131/66 A |
| 2,172,804 | 9/1939 | Molins | 131/39 |
| 2,208,504 | 7/1940 | Arelt | 131/67 |
| 2,286,306 | 6/1942 | Randolph | 131/66 A |
| 2,351,410 | 6/1944 | DiIanni | 131/84 A |
| 2,423,554 | 7/1947 | Davidson | 131/61 A |
| 2,544,968 | 5/1951 | Thompson | 100/151 |
| 2,604,099 | 7/1952 | Poliansky | 131/61 R |
| 2,760,493 | 8/1956 | Bell et al. | 131/61 R |
| 2,911,980 | 11/1959 | Richter et al. | 131/84 R |
| 3,032,041 | 5/1962 | Lanore | 131/61 B |
| 3,244,184 | 4/1966 | Petru | 131/84 C |
| 3,795,249 | 3/1974 | Cristiani | 131/61 B |
| 3,850,177 | 11/1974 | Labbe | 131/66 R |
| 3,851,652 | 12/1974 | Labbe | 131/84 C |
| 3,854,486 | 12/1974 | Molins | 131/61 A |
| 3,854,487 | 12/1974 | Molins et al. | 131/61 A |

FOREIGN PATENT DOCUMENTS

| | | | |
|---|---|---|---|
| 935004 | 10/1946 | France | 131/84 A |
| 1106498 | 3/1968 | United Kingdom | 131/84 B |

*Primary Examiner*—V. Millin
*Attorney, Agent, or Firm*—John C. Smith, Jr.

[57] ABSTRACT

Filter tipped cigarettes are produced by dividing a continuous tobacco stream into alternate sections having respective lengths corresponding to a double cigarette filler and a double filter portion. The double filter portion sections are removed from the stream to leave spaced double filler sections which proceed to a position where double filter portions are inserted in the gaps left by the removed sections. The stream of alternating tobacco sections and filter portions is continuously wrapped and subsequently cut at the middles of the tobacco sections and filter portions to produce individual filter cigarettes. The sections of tobacco removed from the continuous stream may be returned to the stream.

48 Claims, 16 Drawing Figures

MANUFACTURE OF FILTER-TIPPED CIGARETTES

Matter enclosed in heavy brackets [ ] appears in the original patent but forms no part of this reissue specification; matter printed in italics indicates the additions made by reissue.

This invention is concerned with the manufacture of filter-tipped cigarettes in which a stream consisting of alternate tobacco and filter portions is enclosed in a continuous wrapper and is subsequently cut at regular intervals. In this context the term "filter" is intended to cover any mouthpiece member which may be joined to a cigarette. The term "tobacco" is intended to include materials other than tobacco which may be used in a cigarette, possibly in combination with tobacco, for example, artificial tobacco.

A cigarette making machine according to the present invention comprises a first conveyor arranged to carry a tobacco stream; means for cutting a tobacco stream while on the conveyor into alternating first and second sections; means for transferring the first sections of the tobacco stream to a second conveyor whilst the second sections continue past the transfer point on the first conveyor to leave gaps between the first sections on the second conveyor; means for inserting filter portions into the gaps between said first sections; and means for forming said first sections and filter portions into a continuous filter cigarette rod.

Another aspect of the invention provides a method of making filter cigarettes comprising forming a continuous tobacco stream, dividing the tobacco stream into alternating first and second sections, directing said first sections along a first path and said second sections along a second path, inserting filter portions into the gaps left between said first sections on said first path, and continuously wrapping said first sections and said filter portions in a wrapper web.

The continuous rod thus formed is preferably cut through the middles of the tobacco stream sections and through the middles of the filters to form finished cigarettes. That is to say, the cigarette sections of the continuous rod are twice the length of the tobacco-filler portions of the finished cigarettes, and likewise the filters in the continuous rod are twice the length of the filters of the finished cigarettes.

In a preferred construction according to this invention the second conveyor is an air-pervious band which holds the tobacco stream sections by suction and deposits them on the continuous wrapper web, with part of the band extending along the wrapper web and preferably converging towards the wrapper web. The filters are placed on the wrapper web upstream of the point at which the tobacco sections are deposited on the wrapper web. By arranging that the band converges towards the wrapper web, it is possible to compress the tobacco portions substantially to their final cross section while they are contained between the wrapper web and the band, thus minimising any tendency for the ends of the tobacco sections to pass over the ends of the filters.

A band as described above may alternatively be used in a different machine in which spaced tobacco stream sections are fed from a first conveyor onto the band. The formation of spaced tobacco stream sections on the first conveyor may be achieved in various ways previously proposed, for example as described in British pat.

application No. 50492/71 or 19712/72 (German OS 2253096 or 2253097).

An example of a machine according to the present invention is shown in the accompanying drawings. In these drawings.

Figure 1:
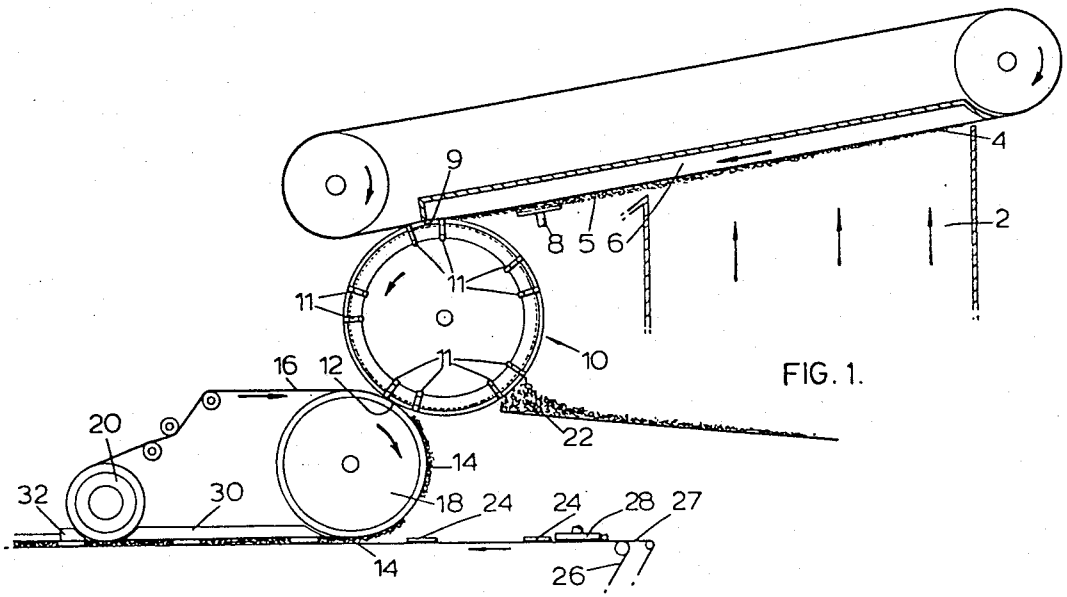
FIG. 1 is a diagrammatic overall view of the machine.

FIG. 1 shows diagrammatically the whole machine. Tobacco is carried upwards by means of air through a chimney 2 and builds up into a continuous tobacco stream 5 on the underneath surface of an air-pervious band 4, suction being applied through the band from a suction chamber 6. The tobacco stream is trimmed by a trimmer 8 and is then transferred to a conveyor wheel 10 at position 9. The tobacco stream is cut by means of knives on the wheel 10 mounted at five pairs of position 11. Between the knives of each pair there is a relatively short length of the tobacco stream which corresponds to a double filter length, the intervening tobacco stream sections being double cigarette lengths.

At a transfer point 12 the double-cigarette length portions of the tobacco stream (referenced 14) are transferred to a band 16 passing round a wheel 18 and returning round a second wheel 20. The intervening double filter length portions of the tobacco stream continue beyond the transfer point 12 on the wheel 10 and are blown off the wheel 10 onto a receiving tray 22.

The tray 22 may be an inclined vibratory tray which spreads the discarded tobacco sections as they progress downwards. This tobacco may be re-used by feeding from the tray 22 into the chimney 2. Alternatively the tobacco from the tray 22 may be separately showered onto the band 4.

Double filter portions 24 are placed on a continuous wrapper web 27 (which is itself carried by a garniture tape 26) by a device 28 and are timed so as to enter the gaps between successive tobacco stream portions 14. A wide strip of adhesive (preferably pressure sensitive) is applied along the top of the wrapper web to secure the filter portions. A lower run of the band 16 passes below a fixed backing member 30 by means of which the band is caused to converge slightly towards the wrapper web 27 so as to compress the tobacco stream portions 14. Preferably the filter portions 24 are also compressed at the same time, being possibly slightly larger in diameter initially than is required for the finished cigarettes. After passing below the wheel 20, the tobacco and filter portions pass under a tongue 32 forming part of a garniture in which the wrapper 27 is wrapped and sealed around the tobacco and filter portions to form a continuous rod.

The operation and details of the machine are shown more clearly in subsequent figures and will now be described.

Figure 3:
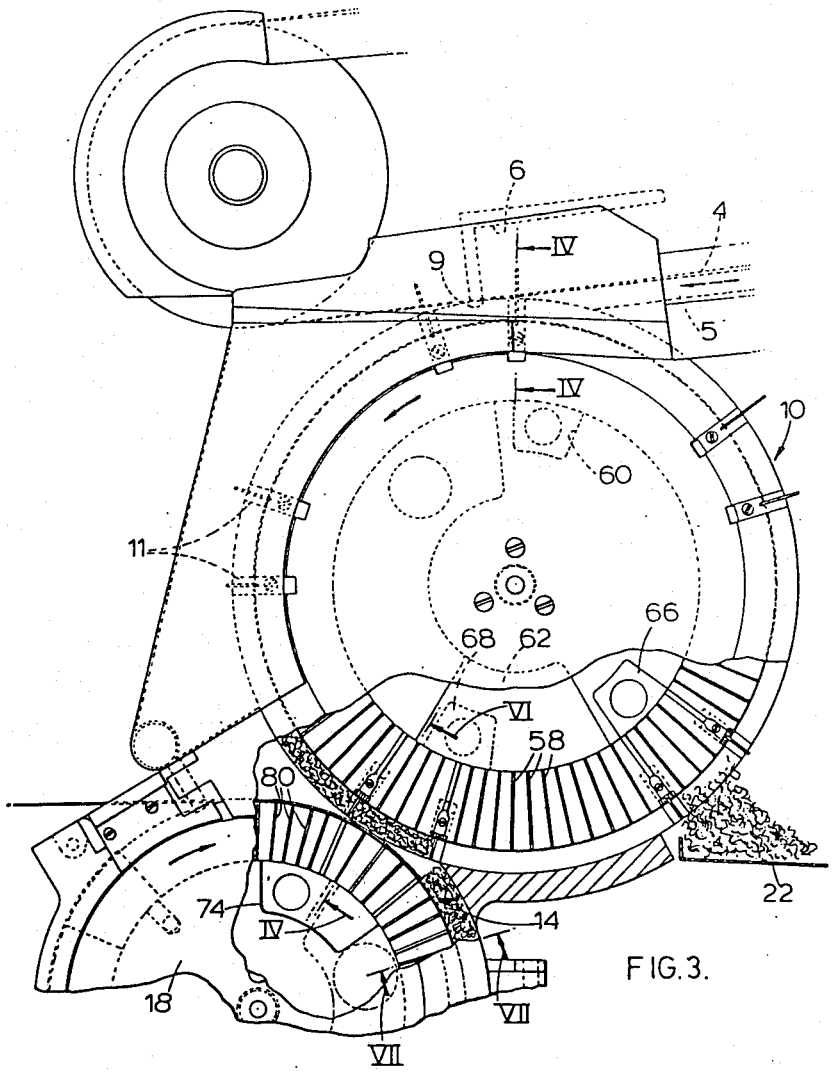
FIG. 3 is an enlarged view of an upper part of the machine.
Figure 4:
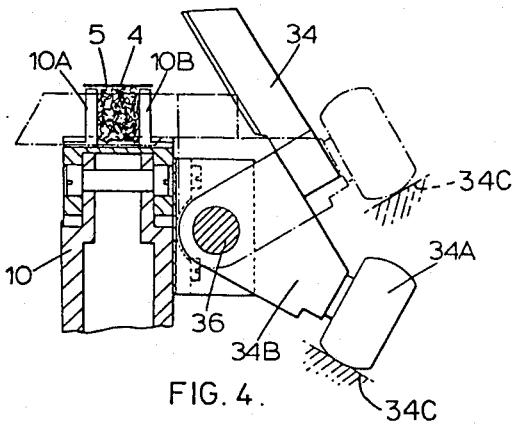
FIG. 4 is a section on the line IV—IV in FIG. 3.
Figure 5:
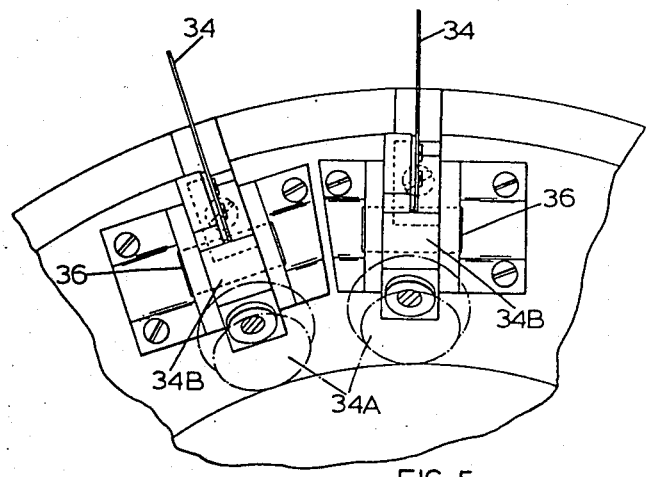
FIG. 5 is a view from the right of FIG. 4.

FIG. 3 shows how the continuous filter stream 5 is transferred from the band 4 to the wheel 10, and how cigarette sections 14 of the filler stream are transferred to the wheel 18. As shown in FIG. 4, the wheel 10 has at its periphery two side walls 10A and 10B between which the filler stream 5 is carried. At each of the cutting positions 11 the wheel 10 carries a knife 34 shown particularly in FIGS. 4 and 5. The knife is pivoted on a pin 36 so that it can move from an inoperative position (shown in solid outline in FIG. 4) to a cutting position shown in chain dotted outline in FIG. 4. Movement of each knife is controlled by a cam indicated at 34C in FIG. 4, acting on a follower roller 34A on a member 34B carrying the knife. It will be understood that the walls 10A and 10B have slots at each cutting position for the passage of the knife.

Each knife 34 may remain in the cutting position up to and beyond the point at which the cigarette sections of the tobacco stream are transferred to the wheel 18; the knife is then moved out of the cutting position in time for the wheel to receive the continuous tobacco stream from the band 4. Alternatively, each knife may move out of the cutting position in advance of the point of transfer 12 to the wheel 18.

As an alternative to the use of knives carried by the wheel 10, there may be a separate cutting device mounted for rotation adjacent to the wheel 10 and carrying one or more pairs of knives for cutting the tobacco stream on the wheel 10.

Figure 6:
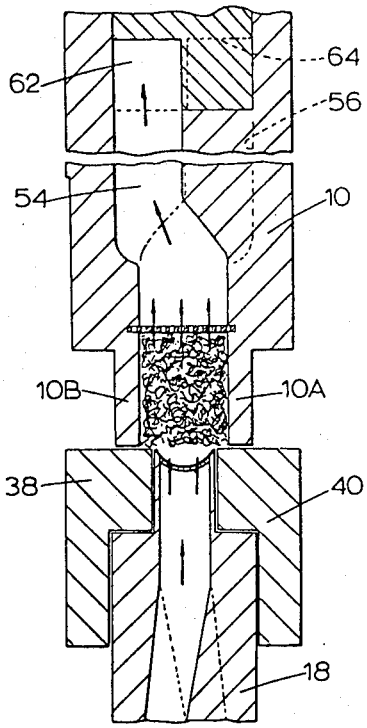
FIGS. 6 and 7 are sections on the lines VI—VI and VII—VII in FIG. 3.
Figure 12:
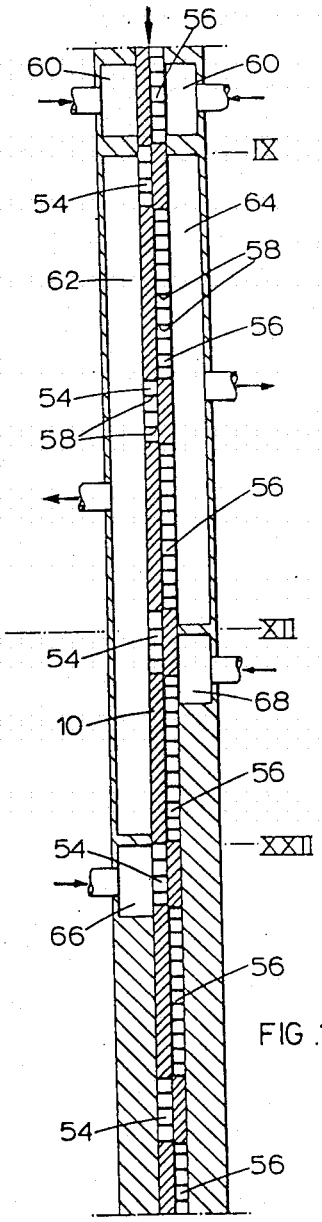

The manner in which the tobacco stream sections are transferred to, held on and transferred from the wheel 10 is shown in FIGS. 6 and 12 and will be described further on.

Figure 2:
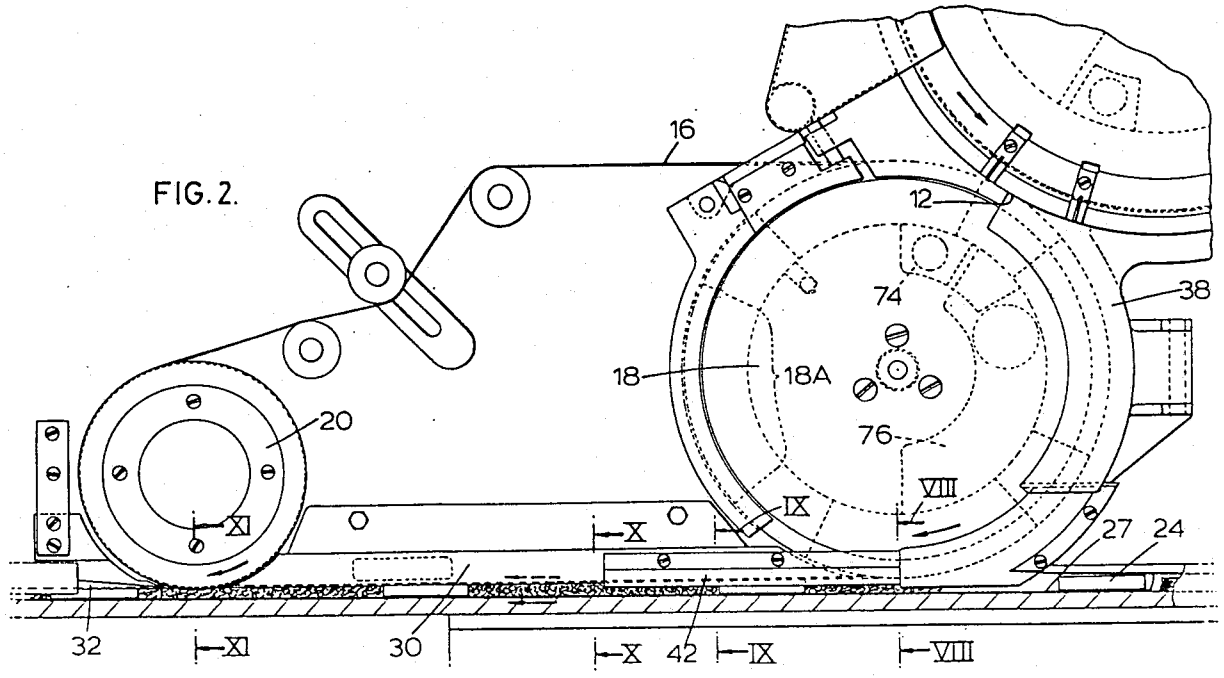
FIG. 2 is an enlarged view of the lower part of the machine.
Figure 7:
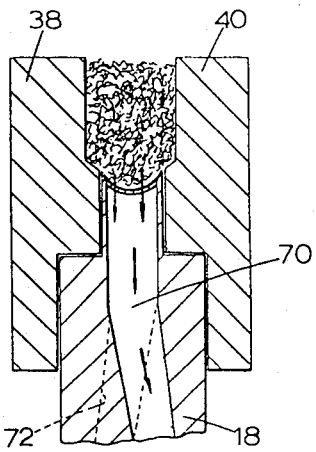
Figure 8:
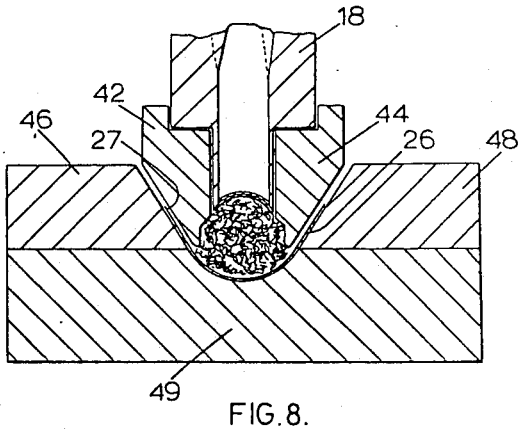
FIGS. 8 to 11 are sections on correspondingly numbered lines in FIG. 2.

FIG. 2 shows how the cigarette sections of the tobacco stream are received by the band 16 and are carried on to the continuous wrapper web 27. It will be noted that the wheel 18 is smaller than the wheel 10 and has only four filler-section carrying stations 18A, instead of five stations as on the wheel 10. The periphery of the wheel 18 is concave in cross-section, as shown in FIGS. 6 to 8. Thus the upper surface of the cigarette sections of tobacco are convex in cross-section so as approximately to match the upper surfaces of the filter sections 24; this arrangement avoids the presence of corners lying above the filters, such corners being obtained if the wheel and consequently also the band 16 has a flat peripheral cross-section.

While the tobacco sections are being carried by means of suction on the band 16, the sides of the tobacco sections are confined by fixed arcuate rails 38 and 40 (see FIG. 7), these rails being cut away in the region of the transfer point 12, as shown in FIG. 6, since the tobacco sections are confined between the walls 10A and 10B of the wheel 10 up to and partially just beyond the transfer point 12.

Figure 9:
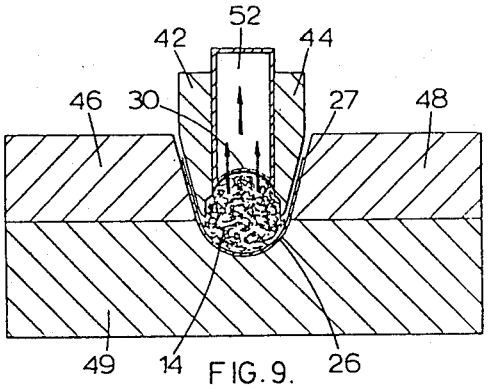
Figure 10:
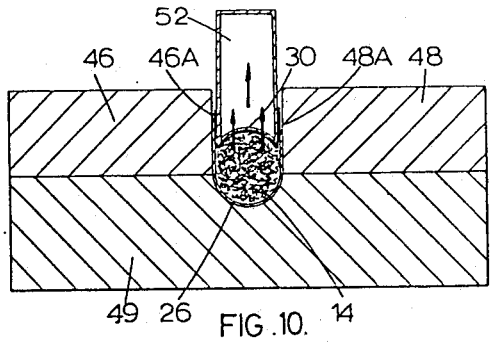
Figure 11:
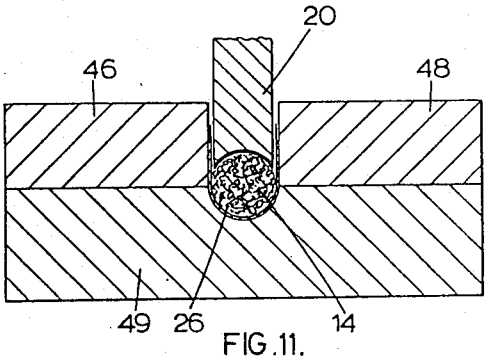

Upon being transferred on to the wrapper web 26 (which at this point is already curved in cross-section) the tobacco sections are confined at their sides by fixed horizontal rails 42 and 44 (see FIG. 8). These rails become progressively narrower, as shown in FIG. 9 to allow the wrapper web 26 to be formed to a progressively narrower U section; and just upstream of the line X—X in FIG. 2, the rails 42 and 44 terminate. At this point fixed side members 46 and 48 supported on a base 49 and having vertical inner walls 46A and 48A respectively hold the web to a vertical-sided U section, at which point the tobacco sections 14 are approximately circular in cross-section, though with a slightly greater height than their width. The height is progressively reduced by means of the fixed backing member 30, which is concave in cross-section and moves progressively closer towards the bottom of the wrapper web 26 so that the tobacco filler sections 14 are substantially circular in cross-section at the line XI—XI in FIG. 2 (see FIG. 11).

It will be seen that the backing member 30 comprises the lower wall of a suction chamber 52, the wall 30 being air pervious so that suction is applied through the band 16. The purpose of this suction is to increase the control on the tobacco, preventing movement, particularly of the upper parts of the end sections.

The band 16 may, for example, be of open nylon weave.

Figure 13:
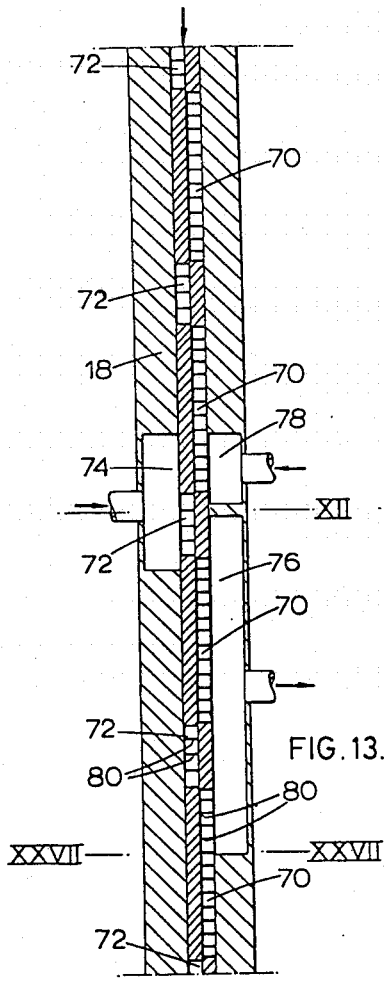
FIGS. 12 and 13 are respectively diagrammatic developed views showing the application of suction and pressure to the two wheels of the machine.

Suction and pressure are used to hold the tobacco on the wheel 10 and the band 16, and to bring about the necessary transfers, as shown diagrammatically in FIGS. 12 and 13. Considering firstly the wheel 10, it should be noted (see FIG. 6) that the filter and cigarette sections of the wheel are supplied with suction and pressure through separate channels 54 and 56 respectively which are axially spaced relatively to one another in the wheel 6. FIG. 6 is a section through one of the channels 54 for supplying suction or pressure to one of the filter sections. Behind the section line VI—VI there is a channel 56, shown in dotted outline, for supplying suction or pressure to one of the cigarette sections of the wheel. All the channels 54 and 56 are divided by closely spaced radial vanes 58, so that the supply of suction or pressure to each section of the wheel can be precisely controlled as the wheel rotates. Within the wheel there are various suction and pressure chambers (e.g. suction chambers 62 and 64 shown in FIG. 6) communicating with the inner ends of the channels 54 and 56, each chamber being positioned axially so as to supply suction of pressure to the channels 54 or to the channels 56 as required.

FIG. 12 is a flat developed view of the periphery of the wheel 10, showing all five channels 54 and all five channels 56. The upper end of FIG. 4 is at a stage just upstream of the transfer point 9 (shown as stage IX) at which the tobacco stream is transferred from the band 4 to the wheel 10. The lower end of FIG. 12 returns to the starting point. Part way up FIG. 12 there is shown stage XII, which corresponds to the point 12 at which the cigarette sections of the tobacco stream are transferred to the wheel 18. The suction and pressure manifolds are shown, for the sake of clarity, on opposite sides of the wheel 10, but it will be appreciated that in practice they are within the wheel 10.

As shown in FIG. 3 and more particularly at the upper end of FIG. 12, immediately upstream of the transfer point 9 there is a pressure chamber 60 for blowing air outwards through the periphery of the wheel 10 to assist in holding the tobacco stream on the band 4; this is in accordance with the invention described in U.S. Pat. No. 3,871,386. Then immediately after the transfer point 9 (stage IX in FIG. 12) there are suction chambers 62 and 64 whereby both the cigarette and filter sections of the tobacco stream are initially held on the wheel 10. The suction chamber 64 for the cigarette sections (i.e. for the channels 56) terminates at the transfer point 12 (stage XII in FIG. 12) so that the cigarette sections can be transferred to the wheel 18. However, the suction chamber 62 extends beyond stage XII to a stage XXII, at which pressure is supplied to the channels 54 from a pressure chamber 66 to blow the filter sections of the tobacco stream off the wheel 10 and into the tray 22. Immediately downstream of stage XII there is a pressure chamber 68 for blowing air into the channels 56 to assist in removing the cigarette sections from the wheel 10 and transferring them to the wheel 18.

The application of suction and pressure to the wheel 18 is shown similarly in diagrammatic fashion by FIG. 13. Stage XII in FIG. 13 corresponds to stage XII in FIG. 12, being the point at which the cigarette sections of the tobacco stream are received by the wheel 18. As shown in FIGS. 7 and 13, the wheel 18 has channels 70 through which suction or pressure is delivered to sections of the wheel carrying tobacco stream sections, and channels 72 leading to sections of the wheel periphery which are empty. The purpose of the channels 72 is to allow air to blow out through the wheel periphery from a pressure chamber 74 to assist in holding the filter sections of the tobacco stream on the wheel 10. The channels 70 communicate with two chambers, namely chamber 76 which is a suction chamber for holding the tobacco sections on the wheel 18 until the transfer to the wrapper web 27 (stage XXVII) and a pressure chamber 78 situated immediately upstream of the transfer point 12 (stage XII) to assist in holding the cigarette sections of the tobacco stream on the wheel 10 immediately upstream of the transfer point 12.

It may be of advantage to provide an additional pressure chamber communicating with the channels 72, this chamber extending substantially from the end of the chamber 74 to the position at which the tobacco sections are transferred to the wrapper web 27 (stage XXVII). This additional chamber, which may be supplied with air at a pressure slightly higher than that supplied to the chamber 74, supplies air to the channels 72 which helps to keep the ends of the tobacco sections clean as they progress on the wheel 18.

The channels 70 and 72 in the wheel 18 have radial vanes for the same reason as mentioned in connection with the wheel 10.

Instead of the band 16 being concave in cross-section, it could be flat. However, it is then desirable to use oversize filters to minimize the tendency to leave top corner gaps into which the ends of the tobacco sections can move while in the garniture. The curved band eliminates such top corner gaps and facilitates the use of normal-size filters; i.e. filters which are fed in at the final diameter.

As an alternative to the wheel 10 arrangement shown in FIGS. 1 and 3, it is possible to use a wheel in which the sections carrying the filter-length sections of the tobacco stream move (for example, radially inwards) so that the filter sections are not transferred to the wheel 18. One example of such an arrangement is shown in FIG. 14, which shows a wheel 80 which is intended to replace the wheel 10 in FIG. 1.

Figure 14:
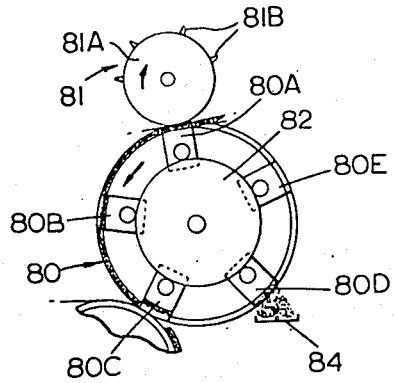
FIG. 14 shows a modified arrangement for the first wheel in FIG. 1.

The wheel 80 in FIG. 14 has radially movable parts 80A, B, C, D and E which move inwards under the control of a cam 82. Parts 80A and 80E are shown in their outer positions. The wheel 80 cooperates with a rotary cutting device 81 comprising a drum 81A carrying appropriately spaced cutting knives 81B arranged to cut the tobacco stream into sections. Part 80B has begun to move inwards. Part 80C is at its inner position. Part 80D has returned to its outer position (or nearly so) so that the tobacco on it can be blown off into a receiving trough 84.

Figure 14A:
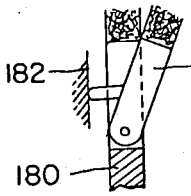
FIG. 14A shows another modified arrangement for the wheel of FIG. 1.

Instead of moving radially, the parts 80A to E of the wheel 80 could each be pivoted so as to swing to the side under the action of the cam. Thus, as shown in FIG. 14A a wheel 180 may comprise a number of pivoted sections 180A which are adapted to be operated by a fixed cam 182 so that they are displaced sideways and then returned into alignment with the major part of the wheel. Another possibility is that the parts of the wheel 80 carrying the filter sections of the tobacco stream could be fixed to the wheel, and the intervening parts carrying the cigarette sections could move radially outwards so as to transfer the cigarette sections of the tobacco stream to the wheel 18 when in their outer positions; the wheel 80 would in this case be basically of smaller diameter.

Figure 15:
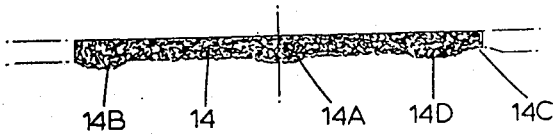
FIG. 15 is a straight developed view showing the tobacco stream after trimming.

The trimmer 8 in FIG. 1 preferably leaves each cigarette section of the tobacco stream substantially as shown in FIG. 15. For this purpose the trimmer may comprise two cooperating discs with shaped peripheral portions, basically as described in British pat. specification No. 881,024.

As shown in FIG. 15, the trimmer leaves an extra mound of tobacco 14A (shown somewhat exaggerated for clarity) at the middle of the tobacco section 14; the finished rod is cut through the middle of this mound, so that this mound serves to produce a well-filled cigarette end, as described in British specification No. 881,024. In addition the trimmer discs leave a mound 14B at the upstream end of the tobacco section; this is to insure that the upstream end is still well filled after passage through the garniture, despite the tendency of the garniture tongue to drag back the top layer of tobacco. At the downstream end of the tobacco section the discs form a recess 14C to help to insure that tobacco, while passing through the garniture, is not dragged back over the leading end of the adjacent following filter section; however, the discs leave a mound 14D upstream of the recess 14C to insure that the downstream end portion of the tobacco section adjacent to the filter does contain sufficient tobacco after passage through the garniture.

If the wheel 10 of FIG. 1 is replaced by the wheel 80 (FIG. 14) or by, for example, the segmented wheel described in U.S. Pat. No. 3,854,487, the filter sections can be fed onto the top run of the band 16. For this purpose suction is applied also through the top run to hold the filters in place. The filters may have or may be given a number of transverse slits extending part of the way through them from the outside to enable them to bend while passing round the wheel 18. Alternatively each filter (i.e. double-length) may comprise a number of short abutting sections (e.g. three), in which case the wrapper web is given a central stripe of adhesive so that the filter pieces are finally held in place by being stuck to the wrapper.

We claim:

1. A cigarette-making machine comprising first conveyor means arranged to carry a tobacco stream; means for cutting said tobacco stream while on said first conveyor means into alternating first and second sections; second conveyor means arranged adjacent said first conveyor means to define therewith a transfer point; means for holding said first and second sections of tobacco in substantial alignment on said first conveyor means while said sections are conveyed up to said transfer point; means for selectively transferring said first sections to said second conveyor means at said transfer point and for holding said second sections on said first conveyor means while said second sections are conveyed beyond said transfer point to leave gaps between said first sections on said second conveyor means; means for inserting filter portions into said gaps between said first sections; and means for forming said first sections and filter portions into a continuous filter cigarette rod.

2. A cigarette-making machine according to claim 1 in which said first sections correspond in length to a double length of tobacco filler for a filter cigarette and said second sections correspond in length to a double length filter for said cigarette.

3. A cigarette-making machine according to claim 1 further comprising suction means for holding said first sections of tobacco on said first conveyor means while said first sections are conveyed up to said transfer point and for holding said second sections of tobacco on said first conveyor means while said second sections are conveyed up to and beyond said transfer point, and further suction means for receiving and holding said first sections on said second conveyor means.

4. A cigarette-making machine according to claim 1 further comprising means for supporting and conveying a continuous wrapper web, said second conveyor means comprising an endless band which is arranged to deposit said first tobacco sections on said continuous wrapper web, said band having a lower run which extends along adjacent the wrapper web.

5. A cigarette-making machine according to claim 4 in which fixed guide rails are arranged adjacent the sides of said wrapper web to confine the sides of said tobacco sections as they travel on said web.

6. A cigarette-making machine according to claim 4 further comprising means for placing said filter portions on said continuous wrapper web upstream of the point at which said tobacco sections are transferred from said band.

7. A cigarette-making machine according to claim 1 further comprising means for feeding said filter portions onto said second conveyor means into said gaps between said first tobacco sections.

8. A cigarette-making machine according to claim 1 in which said cutting means comprises at least one pair of knives carried by said first conveyor means.

9. A cigarette-making machine according to claim 15 in which each knife is pivotally mounted on said first conveyor means, said machine further comprising a cam follower and a cam track for operating said knife.

10. A cigarette-making machine according to claim 1 in which said cutting means comprises a rotary cutting device mounted adjacent said first conveyor means.

11. A cigarette-making machine according to claim 1 in which said first conveyor means comprises a suction wheel having a peripheral trough bounded by side walls.

12. A cigarette-making machine according to claim 1 further comprising means carried by said first conveyor means for supplying air pressure for removing said second tobacco sections from said first conveyor means at a position downstream of said transfer point.

13. A cigarette-making machine according to claim 1 further comprising means for moving said second tobacco sections away from said first conveyor means and for returning them to the tobacco stream supplied to said first conveyor means.

14. A cigarette-making machine according to claim 1 further comprising a band for supporting said tobacco stream as it is formed and for subsequently transferring said tobacco stream to said first conveyor means.

15. A cigarette-making machine according to claim 14 further comprising means for forming said tobacco stream by showering on to said band.

16. A cigarette-making machine according to claim 15 in which said band onto which tobacco is showered has a substantially horizontal lower run onto which tobacco may be showered upwardly by means of an air stream, including suction means for holding said tobacco stream on said band.

17. A cigarette-making machine according to claim 14 in which trimming means are arranged adjacent said band for trimming the tobacco stream before it is transferred to the first conveyor.

18. A cigarette-making machine comprising first conveyor means arranged to carry a tobacco stream; means for cutting said tobacco stream while on said first conveyor means into alternating first and second sections; second conveyor means arranged adjacent said first conveyor means to define therewith a transfer point; means for transferring said first sections to said second conveyor means while said second sections continue on said first conveyor means past said transfer point to leave gaps between said first sections on said second conveyor means; means for inserting filter portions into said gaps between said first sections; means for supporting and conveying a continuous wrapper web along a path; and means for forming said first sections and filter portions into a continuous filter cigarette rod; said second conveyor means comprising an endless band arranged to deposit said first tobacco sections on said continuous wrapper web, said band having a lower run which extends along adjacent said wrapper web and which converges towards said wrapper web in the direction of travel of said web along said path, whereby said first tobacco sections deposited on said web may be compressed slightly between said web and said band.

19. A cigarette-making machine according to claim 18 further comprising a fixed backing member under which said lower run of said band passes.

20. A cigarette-making machine according to claim 19 in which said endless band and said backing member are air pervious, said machine further comprising means defining a suction chamber, said backing member constituting a wall of said chamber through which said suction may be applied to said band.

21. A cigarette-making machine according to claim 19 in which said backing member guiding said band has a concave cross-section.

22. A cigarette-making machine according to claim 18 in which said first conveyor means comprises a wheel having relatively movable parts for supporting said first and second tobacco sections respectively, said respective parts being movable so that they are in alignment at a position where a continuous stream of tobacco may be received on said wheel and out of alignment at said transfer point to said second conveyor means whereby only said first tobacco sections are transferred to said second conveyor means.

23. A cigarette-making machine according to claim 22 further comprising means for moving said parts radially relative to said wheel.

24. A cigarette-making machine according to claim 22 further comprising means for moving said parts axially relative to said wheel.

25. A cigarette-making machine according to claim 24 further comprising pivot means mounting said parts for supporting said second tobacco sections whereby said parts for supporting said second tobacco sections are pivotally movable relative to said parts for supporting said first tobacco sections.

26. A cigarette-making machine comprising first conveyor means arranged to carry a tobacco stream; means for cutting said tobacco stream while on said first conveyor means into alternating first and second sections; second conveyor means arranged adjacent said first conveyor means to define therewith a transfer point; means for transferring said first sections to said second conveyor means while said second sections continue on said first conveyor means past said transfer point to leave gaps between said first sections on said second conveyor means; means for inserting filter portions into said gaps between said first sections; means for supporting and conveying a continuous wrapper web along a path; means for forming said first sections and filter portions into a continuous filter cigarette rod; said second conveyor means comprising a suction wheel arranged adjacent said first conveyor means, another wheel spaced from said suction wheel and an air pervious endless band passing around said suction wheel and said other wheel arranged to deposit said first tobacco sections on said wrapper web.

27. A cigarette-making machine according to claim 26 in which said suction wheel around which the endless band passes has a concave peripheral cross-section.

28. A cigarette-making machine according to claim 27 in which a pair of arcuate fixed rails are arranged adjacent said suction wheel to confine said sides of the tobacco sections on said suction wheel.

29. A cigarette-making machine according to claim 26 in which said first conveyor means comprises a wheel having relatively movable parts for supporting said first and second tobacco sections respectively, said respective parts being movable so that they are in alignment at a position where a continuous stream of tobacco may be received on said wheel and out of alignment at said transfer point to said second conveyor means, whereby only said first tobacco sections are transferred to said second conveyor means.

30. A method of making filter cigarettes comprising forming a continuous tobacco stream, cutting the tobacco stream into alternating first and second sections as they are conveyed along a first path, feeding said first and second sections along said first path after cutting said stream, subsequently selectively directing said first sections with gaps left therebetween along second path while continuing to convey said second sections along said first path and said second sections along a third path, inserting filter portions into said gaps left between said first sections on said second path, and continuously wrapping said first sections and said filter portions in a wrapper web.

31. A method according to claim 30 in which said second sections are returned along said third path to form part of said continuous tobacco stream.

32. A method according to claim 30 further comprising trimming said continuous tobacco stream before dividing it into sections, said trimming leaving slight mounds of tobacco at positions corresponding to the upstream end and middle of each first section.

33. A method according to claim 32 in which said trimming leaves a recess at positions corresponding to the downstream end of each first section and a slight mound immediately upstream of the recess.

34. A method according to claim 30 in which said first tobacco sections and said filter portions are passed into a region where they are compressed before they are continuously wrapped.

35. A cigarette-making machine for forming a stream of endwise-moving spaced tobacco sections with gaps between said sections, an endless band arranged to receive said spaced tobacco sections, a conveyor for feeding a continuous wrapper web, means for feeding said spaced tobacco sections from said endless band onto said continuous wrapper web on said conveyor, means for inserting filter portions in said gaps between said tobacco sections, said endless band having a lower run which extends along and is spaced from said conveyor, said conveyor and said endless band converging in the direction of travel of said continuous wrapper web, whereby said tobacco sections and said filter portions may be compressed slightly, and means for wrapping said filter portions and said tobacco sections in said continuous wrapper web after said compression.

36. A cigarette-making machine according to claim [34] *35* further comprising means for feeding said filter portions onto said continuous wrapper web before said tobacco sections.

37. A cigarette-making machine according to claim [36] *35* further comprising means for feeding said filter portions onto said endless band.

38. A cigarette-making machine according to claim 35 further comprising a suction wheel and another wheel spaced from said suction wheel, said endless band being air pervious and arranged to pass around said suction wheel and said other wheel.

39. A cigarette-making machine comprising a suction band having a substantially horizontal lower run onto which tobacco may be showered upwardly by means of an air stream to form a tobacco stream thereon; first conveyor means arranged to receive said tobacco stream from said suction band; means for cutting said tobacco stream while on said first conveyor means into alternating first and second sections; means for supporting and conveying a continuous wrapper web; a transfer conveyor in the form of an endless band which is arranged adjacent said first conveyor means to define therewith a transfer point and which has a lower run which extends along adjacent said continuous wrapper web; means for selectively transferring said first sections of tobacco from said first conveyor means to said endless band while said second sections continue on said first conveyor means past said transfer point such that gaps are left between said first sections on said endless band; means for transferring said first sections of tobacco onto said continuous wrapper weeb from said endless band; means for inserting filter portions into said gaps between said first sections; and means for forming said first sections and filter portions into a continuous filter cigarette rod by wrapping in said wrapper web.

40. A cigarette-making machine according to claim 39 in which the lower run of the endless band converges towards said wrapper web in the direction of travel of said web, whereby said first tobacco sections deposited on said web may be compressed slightly between said web and said band.

41. A cigarette-making machine according to claim 39 further comprising a suction wheel adjacent said first conveyor, and another wheel spaced from said suction wheel, said endless band being air pervious and arranged to pass around said suction wheel and said other wheel.

*42. A rod-making machine comprising a conveyor arranged to move along a first path for feeding a wrapper web and a filler stream supported by the web, an air-pervious endless band arranged to feed at least part of said filler stream onto said wrapper web, a suction wheel having a concave peripheral cross-section and around which said band passes where it feeds said part of said filler stream onto said wrapper web, said endless band having a run arranged to move along a second path extending from said suction wheel and spaced from said conveyor, the paths of said conveyor and said run of said endless band converging in the direction of travel of said wrapper web to compress slightly said filler stream on said web between said run of said band and said conveyor, and means for wrapping the compresed filler stream in said wrapper web.*

*43. A rod-making machine according to claim 42, wherein said band is air-pervious, said machine further comprising a fixed backing member above said second path and means for applying suction through said band from said suction wheel and from said backing member.*

*44. A rod-making machine comprising a conveyor for feeding a wrapper web and a filler stream supported by said web, an endless band having a run which extends along and is spaced from said conveyor, a rotatable wheel at an upstream end of said run and around which said band passes, said wheel having a concave peripheral cross-section, a fixed backing member having a concave cross-section, said run of said endless band passing below and being guided by said wheel and said backing member, said conveyor and said run of said endless band converging in the direction of travel of said wrapper web to compress slightly said filler stream on said web between said run of said band and said conveyor, and means for wrapping the compressed filler stream in said wrapper web.*

*45. A rod-making machine comprising a conveyor for feeding a wrapper web and a filler stream supported by said web, an endless band arranged to receive at least part of said filler stream and feed it onto said web, said band having a run which extends along and is spaced from said conveyor, a fixed backing member having a surface contacting the side of said band opposite said conveyor along substantially the entire length of said run coextensive with said conveyor, said surface of said backing member along its entire length having a concave cross-sectional configuration for guiding and maintaining said run of said band in a concave cross-sectional configuration substantially the same as the cross-sectional surface configuration of said filler stream in a final compressed shape, said conveyor and said run of said endless band converging in the direction of travel of said wrappar web to compress slightly said filler stream on said web between said band and said conveyor, said run of said endless band being arranged at least partly to convey said filler stream from a first position at which said at least part of said stream is introduced onto said web and a second position wherein said filler stream has reached substantially its final cross-sectional compressed shape for forming into a rod, and means immediatedly downstream of said second position for wrapping and sealing the compressed filler stream in said wrapper web.*

*46. A rod-making machine according to claim 45 including means between said first and second positions for guiding said wrapper web progressively to confine the sides of said filler stream for substantially the entire length of said run of said endless band.*

*47. A rod-making machine comprising a conveyor for feeding a wrapper web and a filler stream supported by said web, an endless band arranged to receive at least part of said filler stream and feed it onto said web, said band having a run spaced from said conveyor, backing means contacting the side of said band opposite said conveyor along substantially the entire length of said run coextensive with said conveyor, said backing means being adapted for guiding and maintaining said run of said band in a concave cross-sectional configuration along its entire length substantially the same as the cross-sectional surface configuration of said filler stream in a final compressed shape, said conveyor and said run of said endless band converging in the direction of travel of said wrapper web to compress slightly said filler stream on said web between said band and said conveyor, said run of said endless band being arranged at least partly to convey said filler stream and extending from a first position at which said at least part of said stream is introduced into said web and a second position at the end of said run of said endless band wherein said stream has reached substantially its final cross-sectional compressed shape for forming into a rod, and means immediately downstream of said run of said endless band at said second position for wrapping and sealing the compressed filler stream in said wrapper web.*

*48. A rod-making machine according to claim 47 further comprising means between said first and second positions for guiding said wrapper web along substantially the entire length of said run of said endless band between said first and second positions to progressively confine the sides of said filler stream.*

* * * * *